United States Patent
Yeh et al.

(10) Patent No.: US 7,557,479 B2
(45) Date of Patent: Jul. 7, 2009

(54) ELECTRIC FAN WITH BEARING

(75) Inventors: Chin-Wen Yeh, Tu Cheng (TW);
Chin-Long Ku, Tu Cheng (TW);
Hsieh-Kun Lee, Tu Cheng (TW)

(73) Assignee: Foxconn Technology Co., Ltd.,
Tu-Cheng, Taipei Hsien (TW)

( * ) Notice: Subject to any disclaimer, the term of this patent is extended or adjusted under 35 U.S.C. 154(b) by 489 days.

(21) Appl. No.: 11/308,725

(22) Filed: Apr. 26, 2006

(65) Prior Publication Data
US 2007/0252459 A1 Nov. 1, 2007

(51) Int. Cl.
*H02K 7/08* (2006.01)
*H02K 9/00* (2006.01)

(52) U.S. Cl. .............................. 310/90; 310/67 R
(58) Field of Classification Search ............ 310/90, 310/67 R; 384/100, 114, 119, 130, 322, 384/397; 417/354, 423.7
See application file for complete search history.

(56) References Cited
U.S. PATENT DOCUMENTS
6,726,450 B2 * 4/2004 Lee et al. .................. 415/230
2005/0117822 A1 * 6/2005 Chen et al. ................ 384/100
2006/0171826 A1 * 8/2006 Wu et al. ................ 417/423.13
2006/0257250 A1 * 11/2006 Wu et al. .................. 415/175
2007/0252459 A1 * 11/2007 Yeh et al. .................... 310/90
2007/0257571 A1 * 11/2007 Hong et al. .............. 310/67 R
2008/0008590 A1 * 1/2008 Yeh et al. .................. 416/174

FOREIGN PATENT DOCUMENTS
CN 1502817 6/2004
CN 1727693 2/2006
TW 492520 6/2002

\* cited by examiner

*Primary Examiner*—James Harvey
(74) *Attorney, Agent, or Firm*—Frank R. Niranjan

(57) ABSTRACT

An electric fan includes a fan base (10), a bearing (40) and a rotor assembly (20). The fan base forms a center tube (11) receiving the bearing therein. The center tube has a wall and a baffle element (110) bending from a top end of the wall. The baffle element engages with a top of the bearing to prevent lubricant oil from leakaing from the top of the bearing. The rotor assembly includes a fan hub (22), and a pivot axle (23) joined to the fan hub. The pivot axle pivotably extends into the bearing. The bearing has a central bore (42) and at least one channel (43) defined in the bearing and located around the bore. As the fan is operated, the lubricating oil repeatedly flows through the at least one channel.

19 Claims, 10 Drawing Sheets

ELECTRIC FAN WITH BEARING

FIELD OF THE INVENTION

The present invention relates generally to an electric fan which is configured in such a manner so as to prevent a leakage of lubricant oil, and more particularly to an electric fan with a low friction bearing.

DESCRIPTION OF RELATED ART

As ICs (Integrated Circuits) such as computer CPUs (Central Processing Units) are being designed to run faster and faster, more and more heat is being generated by these ICs. Electric fans are typically used to dissipate the heat generated by these ICs.

Referring to FIG. 10, a conventional fan 90 includes a stator assembly and a rotor assembly pivotable with respect to the stator assembly. A bearing 92 is secured within a sleeve 94 of the stator assembly and is usually used to pivotably support a pivot axle 98 of the rotor assembly. An oil retaining ring 96 is located above the bearing 94. Lubricant oil is usually used to lubricate an interface of the bearing 92 and the pivot axle 98, thereby reducing noise caused by physical contact during pivoting of the pivot axle 98, and reducing wear on the pivot axle 98 and the bearing 92 to extend lifetime of the fan 90. However, the lubricant oil is prone to leakage during use of the fan 90, particularly when the fan 90 acts as a system fan located at a lateral side of a computer enclosure, because a gap is formed between a circumferential surface of the ring 96 and an inner circumference of a top end of the sleeve 94. Furthermore, when the system fan 90 stops, the oil often flows back to a top of the bearing 92 and then leak out from the top end of the sleeve 94. As the lubricant oil is lost, the performance of the fan 90 (i.e. noise control, fan operation stabilization, etc.) deteriorates rapidly. Once the lubricant oil is exhausted the fan 90 can no longer be used. It is desirable, therefore, to provide a structure which can prevent the loss of lubricant oil.

SUMMARY OF INVENTION

According to one embodiment, an electric fan includes a fan base, a bearing and a rotor assembly. The fan base forms a center tube receiving the bearing therein. The center tube has a wall and a baffle element bent from a top end of the wall. The baffle element engages with a top of the bearing to prevent lubricant oil from leakage from the top of the bearing. The rotor assembly includes a fan hub, and a pivot axle joined to the fan hub. The pivot axle pivotably extends into the bearing. The bearing has a central bore and a plurality of evenly spaced channels defined in the bearing and located around the bore. As the fan is operated, the lubricating oil flows continuously through the channels.

Other advantages and novel features of the present invention will become more apparent from the following detailed description of preferred embodiment when taken in conjunction with the accompanying drawings, in which:

DETAILED DESCRIPTION

Figure 1:
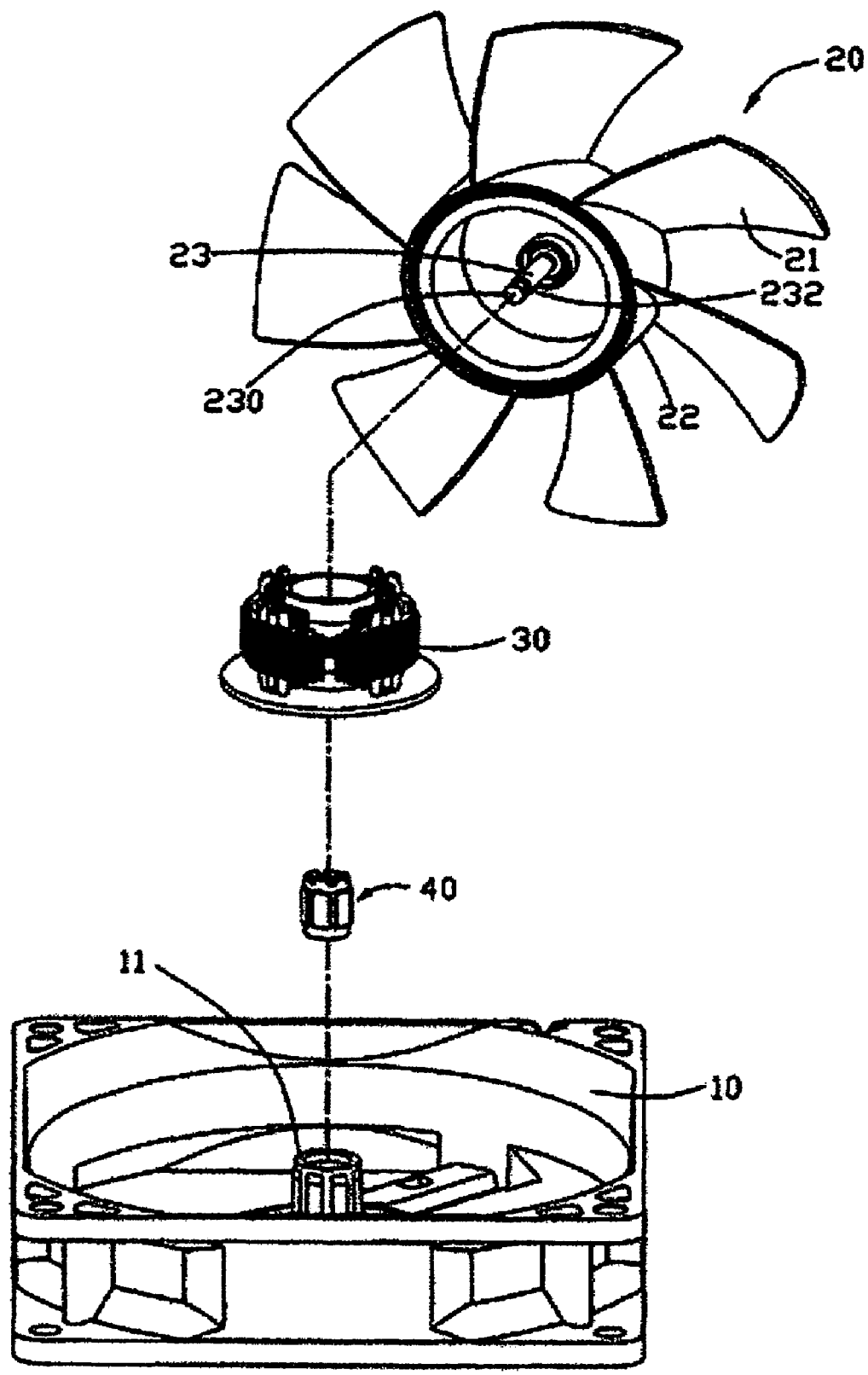
FIG. 1 is an exploded, isometric view of an electric fan in accordance with a preferred embodiment of the present invention.

FIG. 1 illustrates by way of example an electric fan in accordance with a preferred embodiment of the present invention. The fan comprises a fan base 10, a rotor assembly 20, a stator assembly 30 and a bearing 40. The rotor assembly 20 is pivotable with respect to the stator assembly 30.

Figure 5:
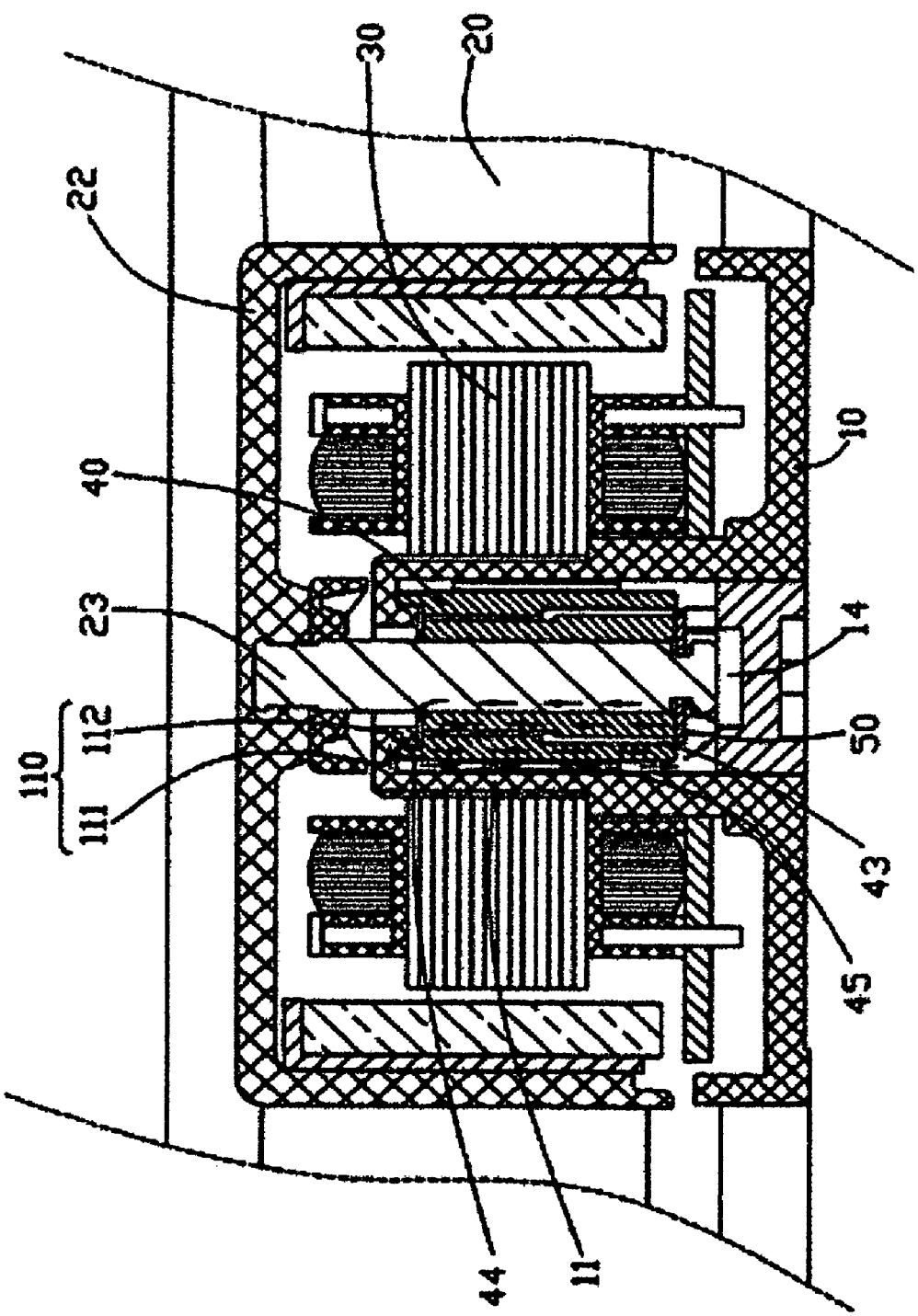
FIG. 5 is an assembled, cross-sectional view of the electric fan of FIG. 1.
Figure 6:
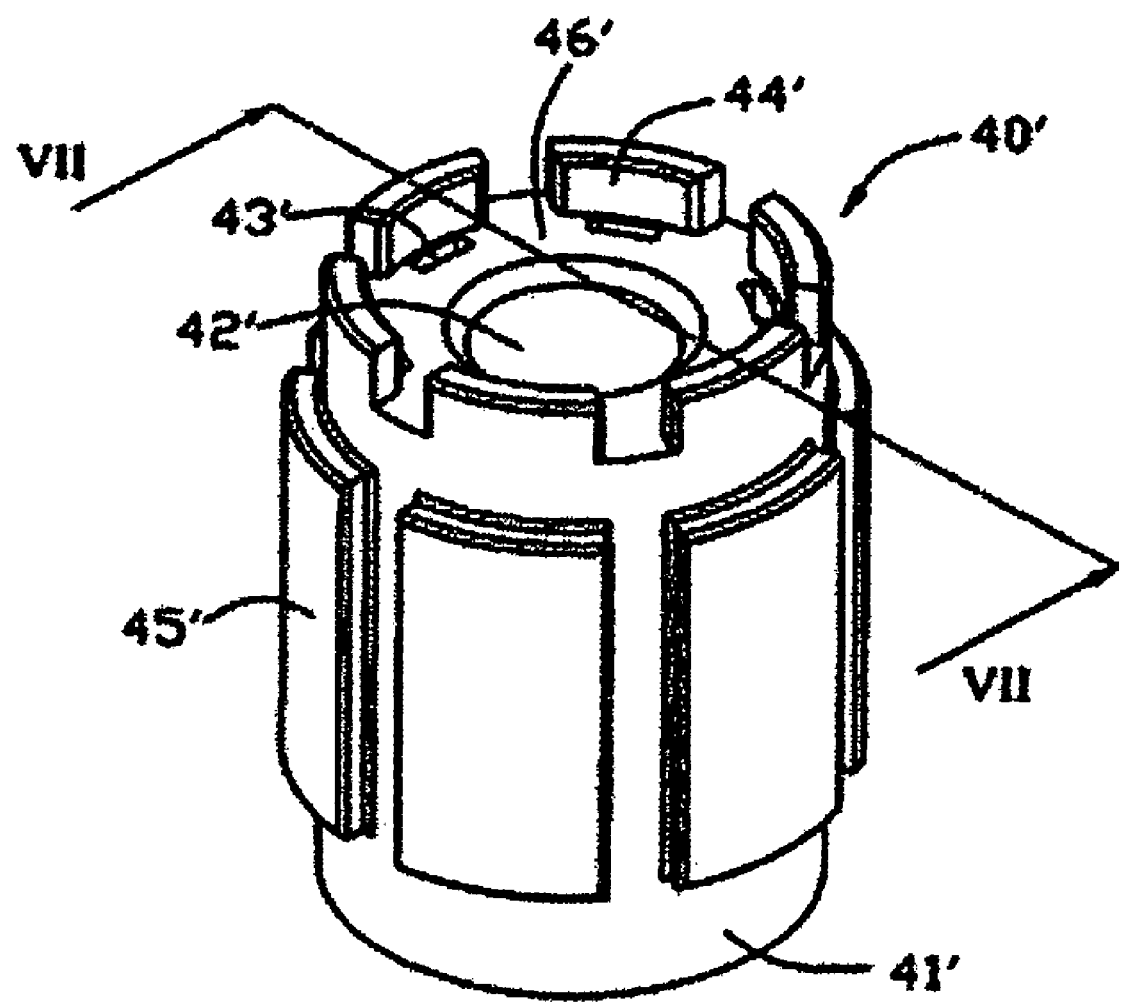
FIG. 6 is an isometric view of a bearing in accordance with an alternative embodiment of the present invention.
Figure 7:
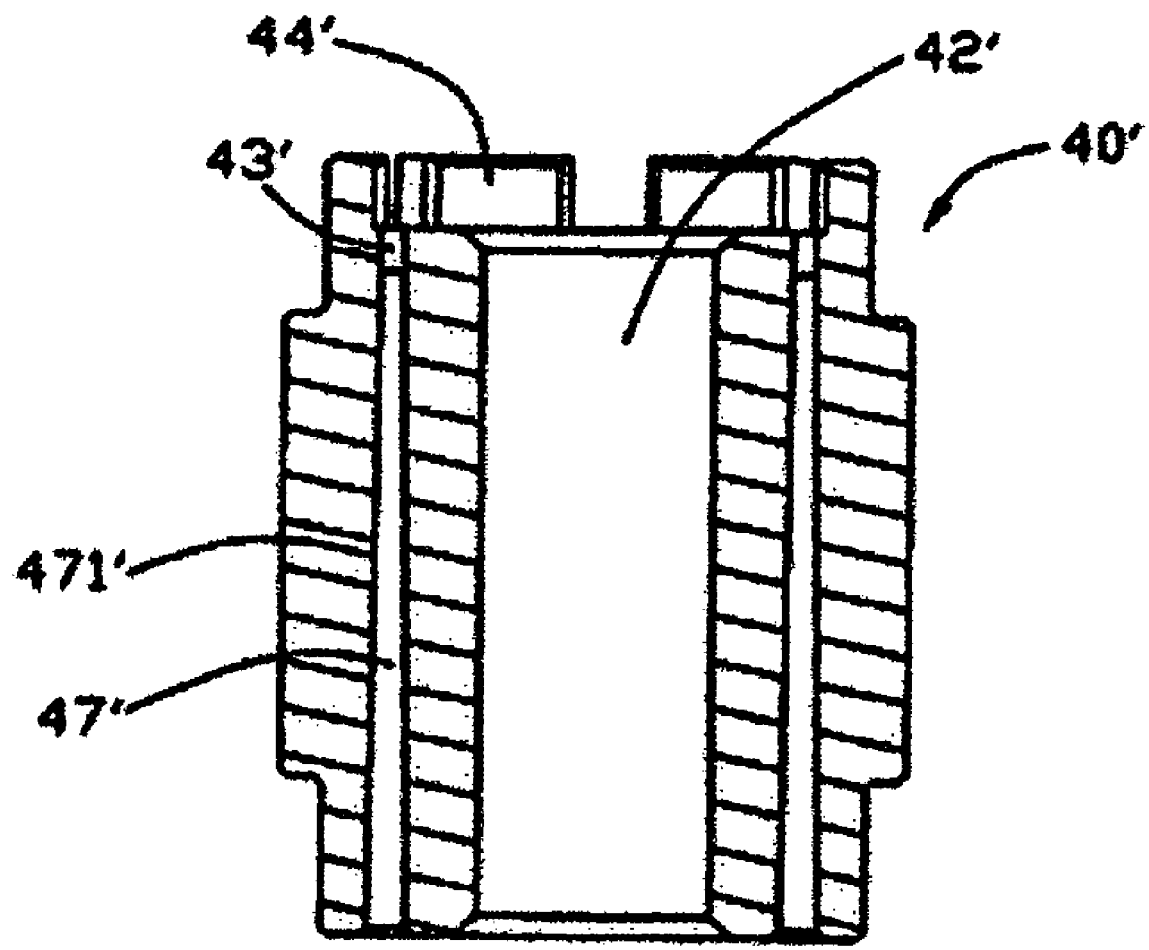
FIG. 7 is a cross-sectional view taken along line VII-VII of FIG. 6.
Figure 8:
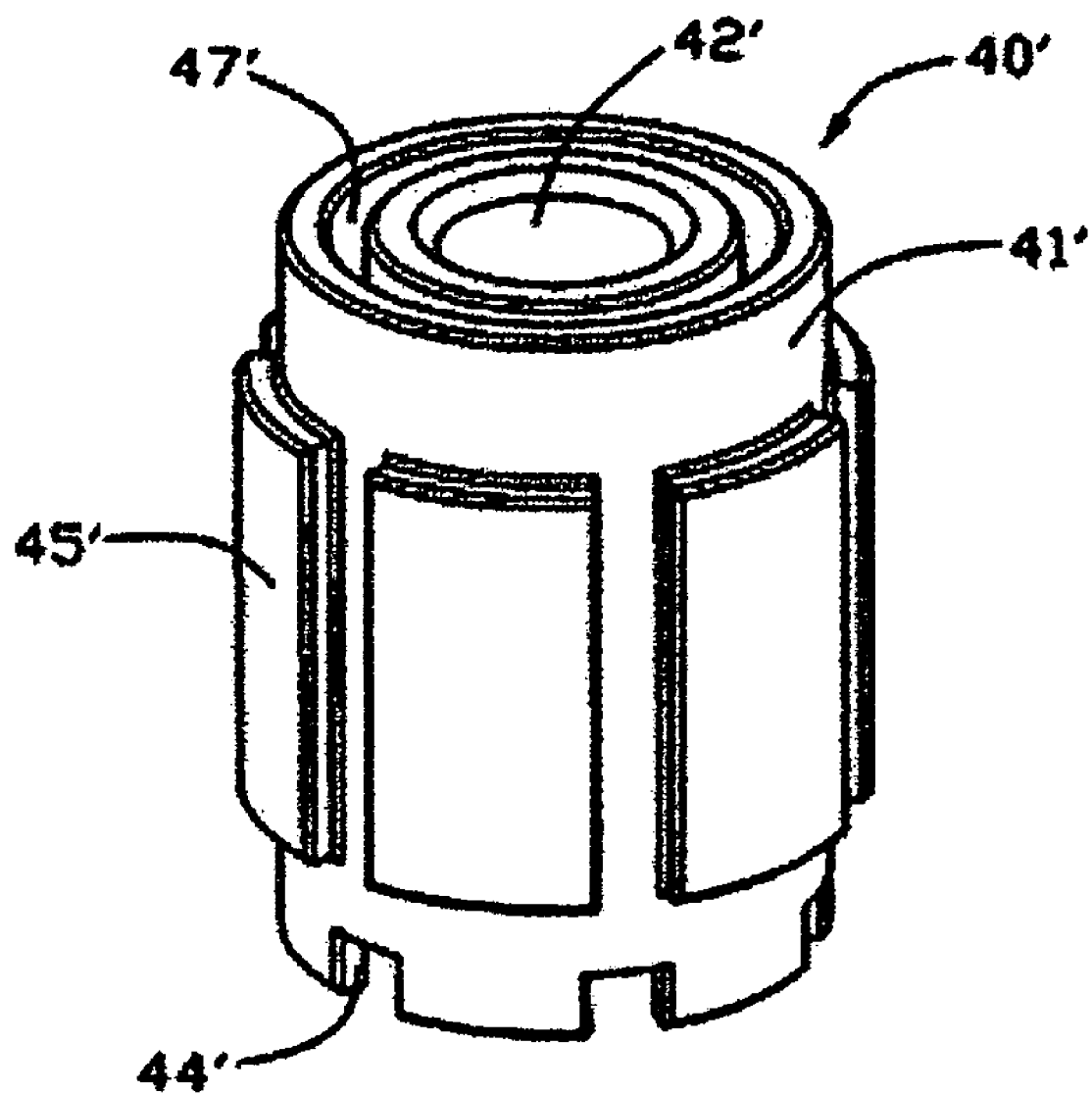
FIG. 8 is a view similar to FIG. 6, but shown from an opposite bottom aspect.
Figure 9:
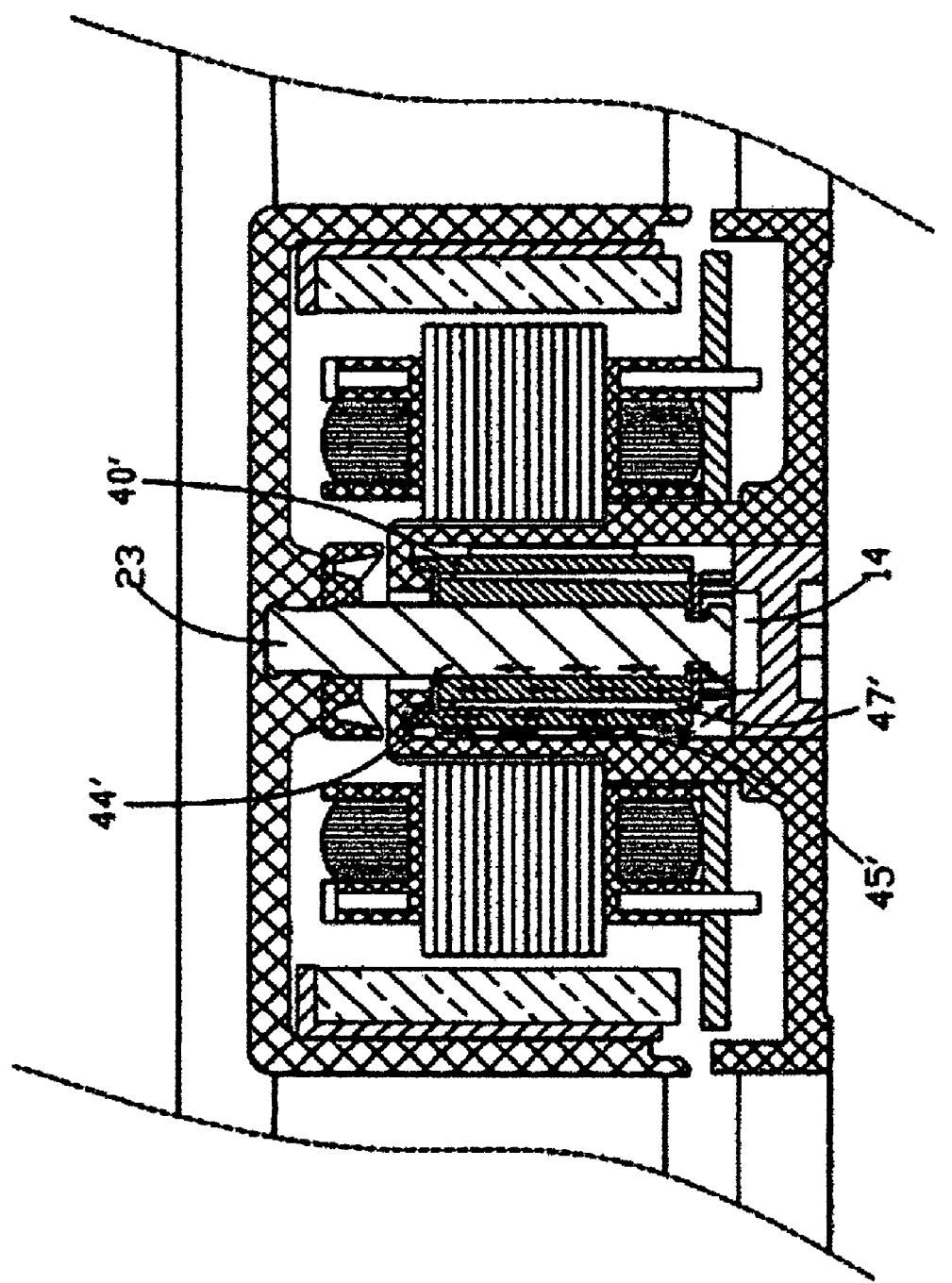
FIG. 9 is an assembled, cross-sectional view of an electric fan incorporating the bearing in accordance with the alternative embodiment of the present invention.
Figure 10:
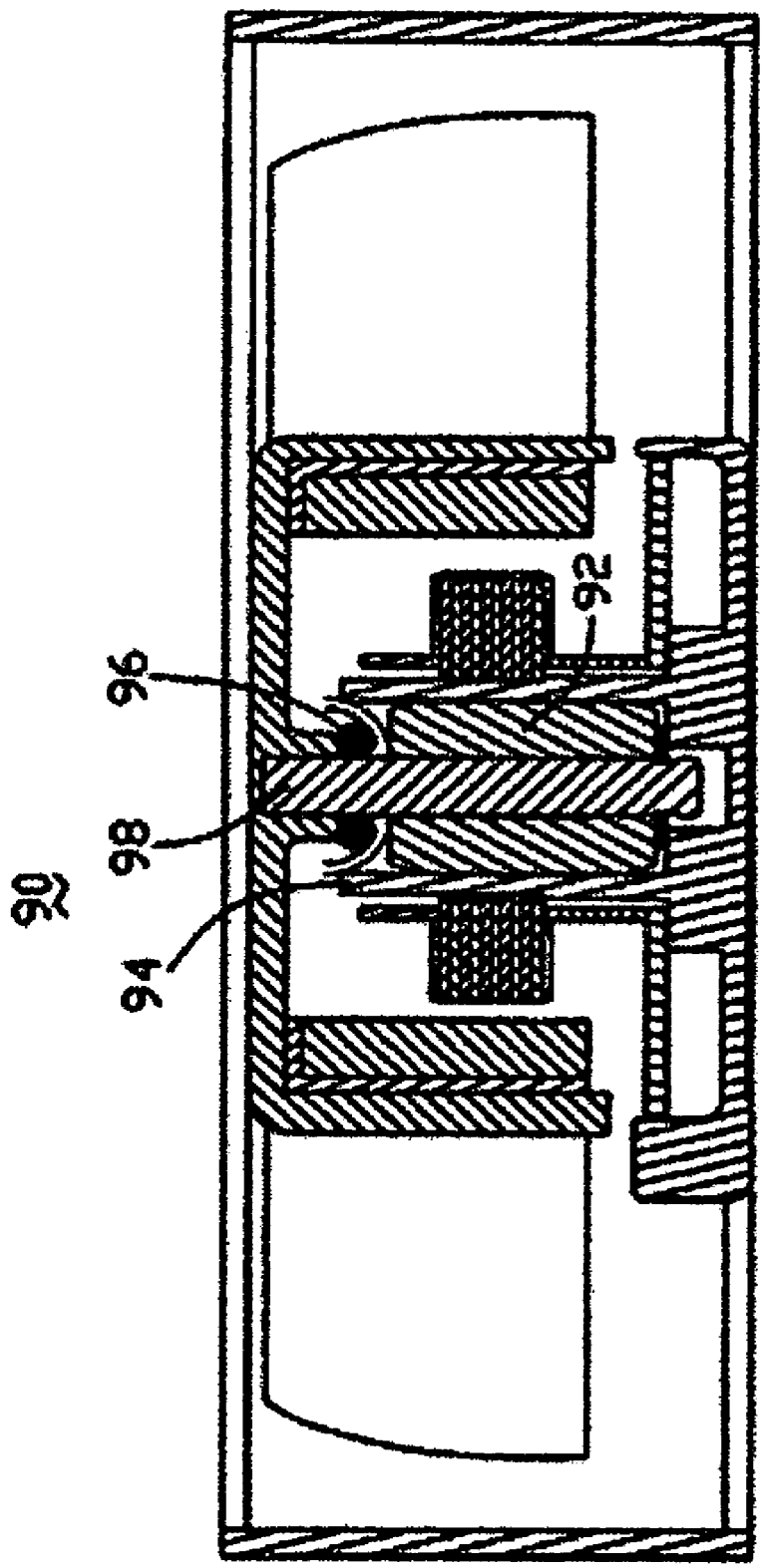
FIG. 10 is a cross-sectional view of a conventional fan.

The fan base 10 defines a cavity therein for receiving the rotor assembly 20 and the stator assembly 30 therein. A central tube 11 is formed at a central portion of the fan base 10. The central tube 11 has a hollow and cylindrical configuration. Referring also to FIG. 5, the bearing 40 is engagingly received in the central tube 11. The stator assembly 30 is attached around the central tube 11. A baffle element 110 bends from a top of a circumferential wall of the center tube 11 and engages with the bearing 40 so as to prevent lubricating oil from leaking from a top end of the bearing 40. The baffle element 110 comprises an annular connecting portion 111 extending perpendicularly, horizontally and inwardly from the top of the wall of the center tube 11 and a leg 112 extending perpendicularly and downwardly from an inner end of the connecting portion 111. A lubricant reservoir 14 is formed in the fan base 10 below the bearing 40, which supplies lubricant oil as the fan is operated.

The rotor assembly 20 comprises a generally cup-like fan hub 22 having a top wall and a periphery wall. A plurality of fan blades 21 are formed around the periphery wall of the fan hub 22. A pivot axle 23 extends perpendicularly downwards from the top wall of the fan hub 22. A semispherical-shaped guiding portion 230 is formed at a distal, bottom end of the pivot axle 23. An annular slot 232 is defined in the vicinity of the guiding portion 230 for receiving a ring 50 (shown in FIG. 5) for which holds the rotor assembly 20 on the fan base 10.

Figure 2:
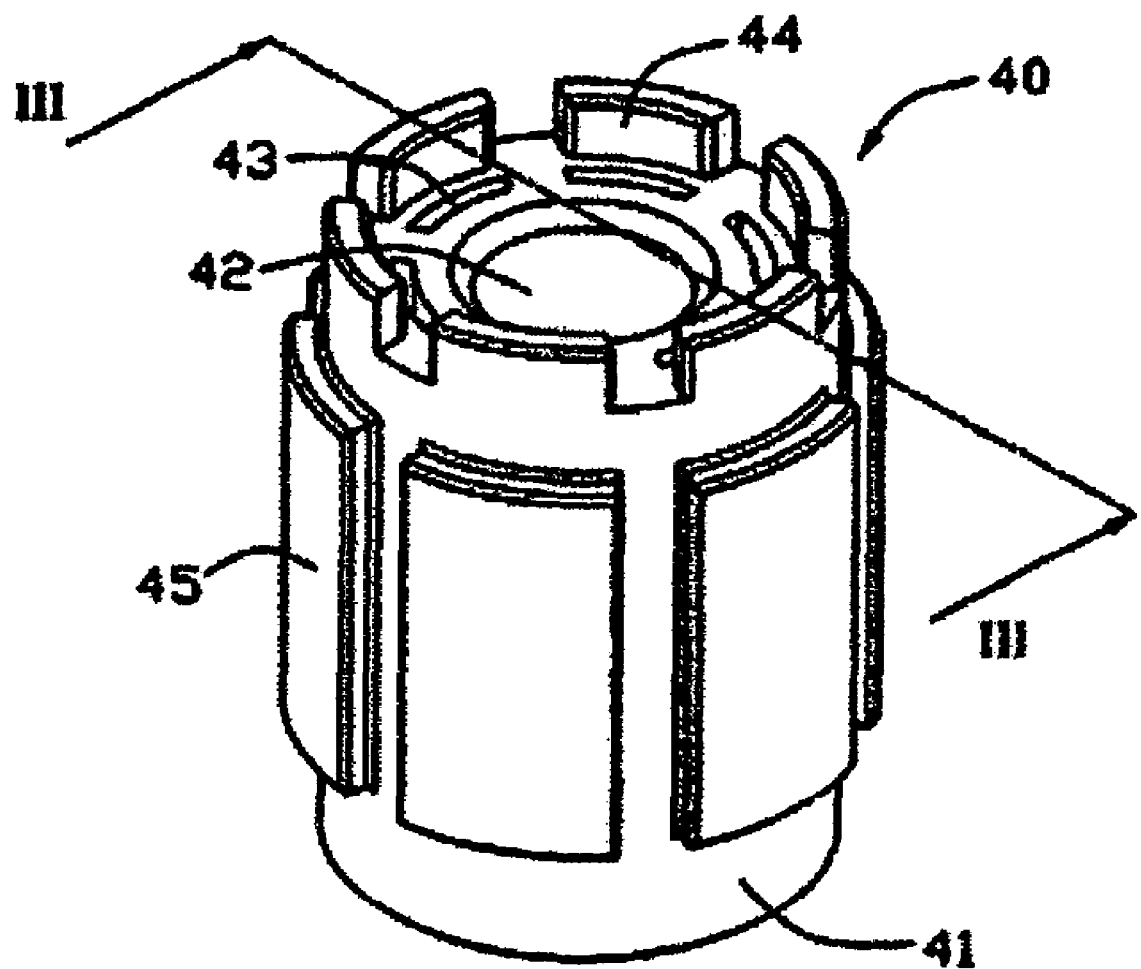
FIG. 2 is an isometric view of a bearing of the electric fan of FIG. 1.
Figure 3:
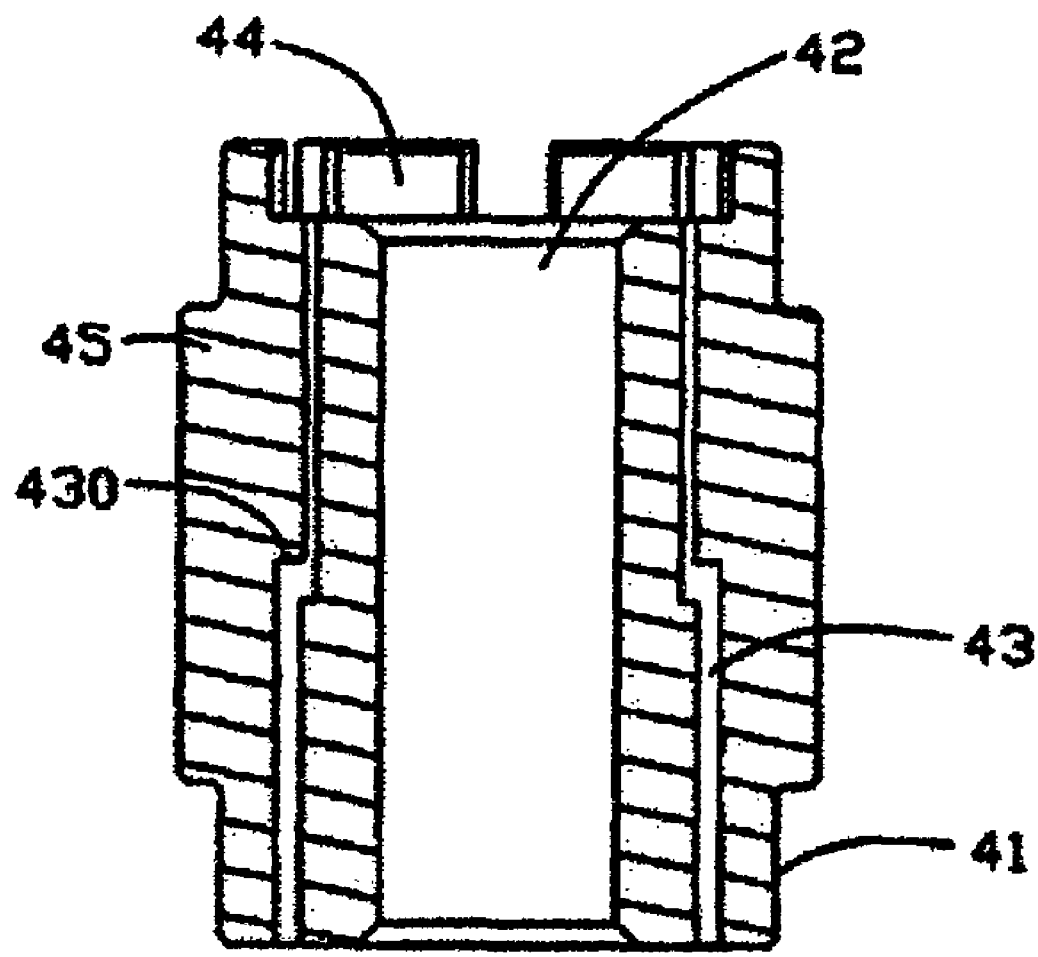
FIG. 3 is a cross-sectional view taken along line III-III of FIG. 2.
Figure 4:
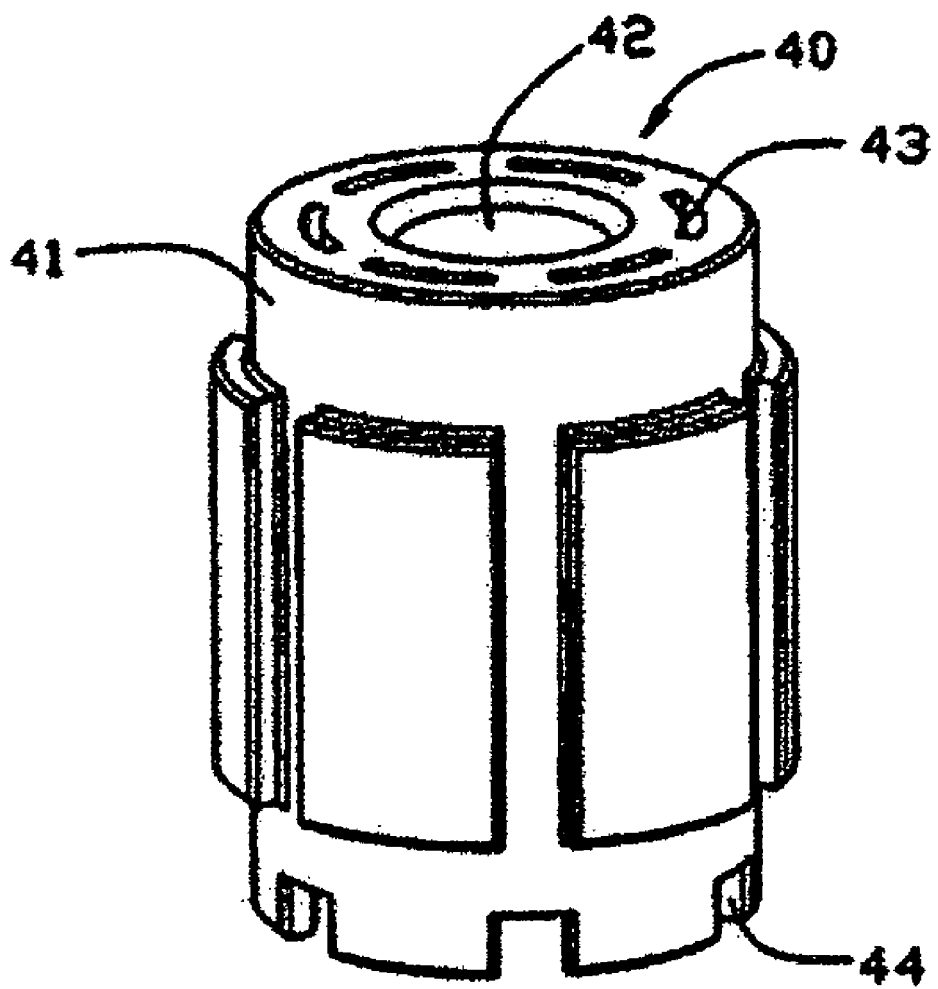
FIG. 4 is a view similar to FIG. 2, but shown from an opposite bottom aspect.

Referring to FIGS. 2-4, the bearing 40 has a cylindrical shape, and has a circumferential outer wall 41. A central bore 42 is defined in a central portion of the bearing 40 for receiving the pivot axle 23 therein. A plurality of evenly spaced channels 43 communicating with the lubricant reservoir 14 are defined in the bearing 40 and around the central bore 42. The channels 43 are separated from the central bore 42. A plurality of evenly spaced protrusions 44 corresponding to the channels 43 extend upwardly from a top end of the outer wall 41. The channels 43 are located between the central bore 42 and the protrusions 44. A plurality of evenly spaced bulwarks 45 corresponding to the channels 43 are circumferentially formed on the outer wall 41. An inner surface of each channel 43 forms a step 430 to prevent the lubricant oil from flowing back to the top of the bearing 40 from the lubricant reservoir 14 as the fan is stopped.

Referring to FIG. 5, as the rotor assembly 20 surrounding the pivot axle 23 is assembled on the fan base 10, the protrusions 44 of the bearing 40 abut against a bottom of the connecting portion 111 of the baffle element 110 of the center tube 11, and an inner surface of the center tube 11 abuts against the bulwarks 45. As the fan is operated, the pivot axle 23 turns in the bearing 40. Under centrifugal force generated by the pivot axle 23, the lubricant oil contained in the lubricant reservoir 14 is drawn upwardly towards a top end of the bearing 40 to lubricate the pivot axle 23 and the bearing 40. Arrows in FIG. 4 show the moving path of the lubricant oil. When the lubricant oil is driven upwardly, one portion of the lubricant oil flows through a gap between the bearing 40 and the pivot axle 23 to lubricate both of them, and another portion of the lubricant oil flows through the channels 43 defined in the bearing 40. When the lubricant oil reaches the top end of the bearing 40, one portion of it flows through the channel 43 and back to the lubricant reservoir 14 and another portion of it flows along the circumferential outer wall 41 via cutouts defined between adjacent two protrusions 44 and back to the lubricant reservoir 14. Since the rotor assembly 20 is continuously turning, the lubricant oil in the lubricant reservoir 14 is then moved upwardly along the pivot axle 23 and the channels 43 by the centrifugal force of the pivot axle 23 to repeat the lubricating process.

In the fan according to the preferred embodiment, the baffle element 110 prevents the lubricant oil from being thrown to the outsides of the center tube 11 particularly when the fan is positioned horizontally on the lateral side of the computer enclosure. Therefore, leakage of the lubricant oil is effectively prevented. Lubricant oil loss is reduced under normal operation of the fan. The lifetime of the fan is thus extended. In addition, the lubricant oil circulates in the fan via twin circulation paths (arrows shown in FIG. 5). This accelerates the lubrication of the pivot axle 23 and the bearing 40 as the fan is operated.

Referring to FIG. 6-9, in an alternative embodiment of the fan, the fan comprises a fan base, a rotor assembly, a stator assembly and a bearing 40'. The fan base, the rotor assembly and the stator assembly in this alternative embodiment have the same configuration as in the previous preferred embodiment. The bearing 40' has a cylindrical shape, and has a circumferential outer wall 41' and a top plate 46'. A central bore 42' is defined in a central portion of the bearing 40' for receiving the pivot axle 23 therein. A plurality of evenly spaced slots 43' is defined in a top plate 46' of the bearing 40' and around the central bore 42'. An annular chamber 47' communicating with the slots 43' and the lubricant reservoir 14 is defined in the bearing 40' and around the central bore 42' of the bearing 40'. The chamber 47' has a wedge-shaped cross section, and its radial width increases gradually from a top end to a bottom end thereof for channeling the lubricant oil flow out of the chamber 47' and toward the lubricant reservoir 14. The chamber 47' comprises an inclined guide surface 471'. A perpendicular distance between the surface 471' and the outer wall 41' is gradually reduced along the top-to-bottom direction to prevent the lubricant oil from flowing back to the top of the bearing 40 from the lubricant reservoir 14 as the fan positioned horizontally on the computer enclosure is stopped. A plurality of evenly spaced protrusions 44' corresponding to the slots 43' extend upwardly from a top end of the outer wall 41'. A plurality of evenly spaced bulwarks 45' corresponding to the slots 43' are circumferentially formed on the outer wall 41'. The lubricant oil is circulated in the fan via twin circulation paths (arrows shown in FIG. 9). This accelerates the lubrication of the pivot axle 23 and the bearing 40' as the fan is operated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electric fan comprising:
a fan base comprising a center tube, the tube having a wall and a baffle element bending from a top end of the wall;
a bearing received in the center tube, the bearing having a central bore and a plurality of channels defined in the bearing and located around the bore, the baffle element engaging with a top of the bearing for preventing lubricating oil from leaking from the top of the bearing; and
a rotor assembly comprising a fan hub, and a pivot axle joined to the fan hub and pivotably extending into the central bore of the bearing;
wherein when the electric fan is operated, the lubricating oil continuously flows through the channels.

2. The electric fan of claim 1, wherein the baffle element comprises a connecting portion extending perpendicularly and inwardly from the top of the wall of the center tube and a leg extending downwardly from an inner end of the connecting portion, wherein the top of the bearing engages with a bottom of the connecting portion.

3. The electric fan of claim 2, wherein the bearing has a circumferential outer wall, and a plurality of evenly spaced protrusions extend from a top end of the outer wall of the bearing, and the protrusions engage with the bottom of the connecting portion.

4. The electric fan of claim 3, wherein the channels are located between the central bore and the protrusions.

5. The electric fan of claim 1, wherein each of the channels comprises an inclined guide surface along which the lubricant oil flows out of the channel and flows toward an end of the bearing.

6. The electric fan of claim 1, wherein each of the channels comprises an inner guide surface having a step to prevent the lubricant oil from flow back to the top of the bearing when the fan is stopped from rotation.

7. The electric fan of claim 1, wherein the bearing comprises a top plate, the channels are defined in the top plate, an annular chamber communicating with the channels is defined in the bearing.

8. The electric fan of claim 7, wherein the chamber comprises an inclined guide surface for channeling the lubricant oil flow out of the chamber and toward an end of the bearing.

9. The electric fan of claim 1, wherein a plurality of evenly spaced bulwarks corresponding to the channels is circumferentially formed on an outer wall of the bearing.

10. The electric fan of claim 1, wherein a lubricant reservoir is formed in the fan base below the bearing for reserving the lubricant oil as the fan is operated, and the channels communicate with the lubricant reservoir.

11. An electric fan comprising:
a fan base securely receiving a bearing and a stator assembly therein, the bearing defining a central bore and at least one channel therein, the at least one channel being separated from the central bore and located between the central bore and an outer wall of the bearing, the at least one channel being configured in such a manner so as to prevent lubricant oil flow back to a top of the bearing as the fan is stopped; and
a rotor assembly having a fan hub, a plurality of fan blades extending radially outwardly from the fan hub and a pivot axle extending from a top wall of the fan hub and rotatably engaging with the bearing;

wherein when the electric fan is operated, lubricating oil repeatedly flows through the at least one channel; and wherein the bearing has an outer wall, a plurality of evenly and spaced protrusions extend upwardly from a top end of the outer wall.

12. The electric fan of claim 11, wherein the at least one channel has a wedge-shaped cross section for facilitating the lubricant oil flow out of the at least one channel and towards an end of the bearing.

13. The electric fan of claim 12, wherein the at least one channel has an inclined inner surface.

14. An electrical fan comprising:
   a fan base having a central tube with a horizontally-extending baffle element at a top end thereof;
   a bearing received in the central tube, having upwardly-extending protrusions at a top end thereof, the protrusions engaging with the baffle element of the central tube and a channel; and
   a shaft rotatably received in the bearing;
   wherein when the shaft rotates, oil moves upwardly between the shaft and the bearing and along the channel to the baffle element of the central tube and the protrusions of the bearing and then moves downwardly therefrom along an outer wall of the bearing.

15. The electric fan of claim 11, wherein the fan base comprises a central tube having a wall and a baffle element bent from a top end of the wall, and the baffle element engages with the protrusions of the bearing to prevent lubricant oil leakage from the top of the bearing.

16. The electric fan of claim 11, wherein the baffle element comprises a connecting portion extending perpendicularly and inwardly from the top end of the wall of the center tube and a leg extending downwardly from an inner end of the connecting portion, wherein the protrusions of the bearing engage with a bottom of the connecting portion.

17. The electric fan of claim 11, wherein the bearing defines a plurality of channels therein, and wherein a plurality of evenly spaced bulwarks corresponding to the channels is circumferentially formed on the outer wall of the bearing.

18. The electrical fan of claim 14, wherein the channel has a width gradually increasing along a top-to-bottom direction of the bearing.

19. The electrical fan of claim 14, wherein the channel forms a step therein for preventing the oil from moving upwardly along the channel when the shaft is stopped from rotation.

* * * * *